United States Patent Office 2,917,524
Patented Dec. 15, 1959

2,917,524

PRODUCTION OF COMPOUNDS OF THE VITAMIN-A SERIES

Horst Pommer, Ludwigshafen (Rhine), and Georg Wittig, Heidelberg, Germany, assignors to Badische Anilin- & Soda-Fabrik Aktiengesellschaft, Ludwigshafen (Rhine), Germany No Drawing. Application April 23, 1957
Serial No. 654,438

Claims priority, application Germany January 26, 1955

6 Claims. (Cl. 260—410.9)

This invention relates to an improved process for the production of compounds of the vitamin-A series, especially of axerophthene and of vitamin-A acid and its esters.

We have found that compounds of the vitamin-A series can be prepared in an advantageous manner by reacting a beta-cyclogeranyl halide with a tertiary phosphine, in particular triphenylphosphine, to form the quaternary phosphonium halide, converting this while excluding air and water by means of about the equivalent amount of a strong base into the corresponding phosphine-ylide (=triphenyl-beta-cyclogeranylidene phosphine of the Formula IV, see below), allowing to act thereon an unsaturated aldehyde of the general formula

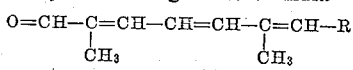

(in which R=$CH_3$, $CH_2OH$, $CH_2OR'$ or $COOR'$ and R' is a lower alkyl radical) and separating the phosphine oxide formed as a by-product.

As strong bases there can be used, for example, alkali and alkaline earth metal amides, alcoholates (such as sodium or potassium methylate, ethylate or butylate), acetylides, or aryls, such as phenyl lithium. These strong bases remove one molecule of hydrogen halide from the quaternary phosphonium halide whereby a phosphine-ylide is formed.

The term "phosphine-ylide" means an unsaturated phosphorous compound which can be represented by the following resonance formulae:

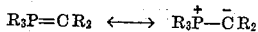

in which each R stands for an organic radical (see: G. Wittig, Angewandte Chemie 63 (1951), p. 15).

The process, in the case of the use of triphenylphosphine (I), beta-cyclogeranyl bromide (II) and isodehydrocitral (V) as initial materials, may be formulated as follows:

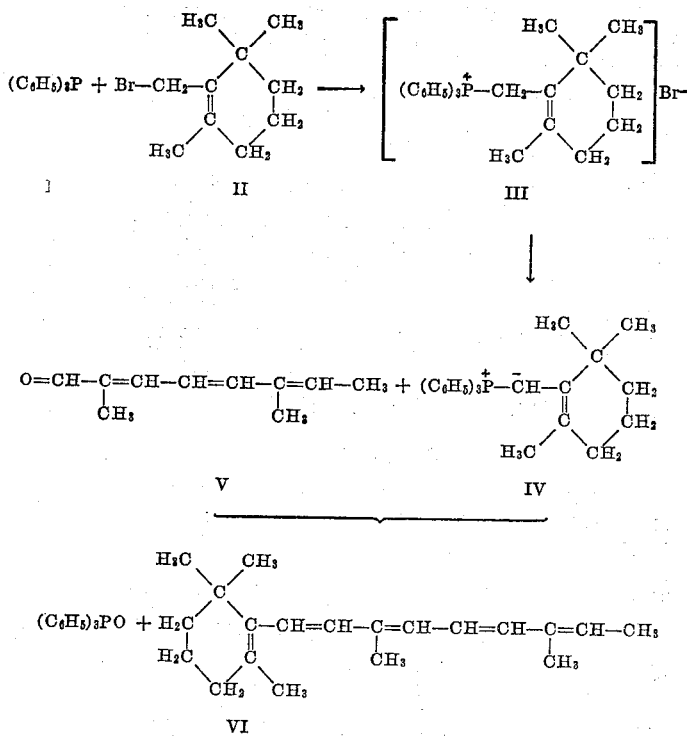

In this way there is obtained axerophthene (VI) by way of the phosphonium salt of the Formula III and the phosphine-ylide of the Formula IV by reaction of the latter isodehydrocitral (V), and vitamin-A by reaction with the corresponding hydroxy-aldehyde (in the general formula R=$CH_2OH$), and vitamin-A acid methyl ester by reaction with the aldehydo-ester (R=$COOCH_3$).

The compounds of the vitamin-A series which are readily accessible by the present process are substances of high biologic activity. They may be used inter alia pharmaceutically.

The following examples will further illustrate this invention but the invention is not restricted to these examples. The parts are by weight.

*Example 1*

Into a solution of 50 parts of triphenyl-beta-cyclogeranyl phosphonium bromide (prepared by reaction of beta-cyclogeranyl bromide with the equimolecular amount of triphenyl phosphine) in 250 parts of absolute ether there are added under nitrogen about equimolecular amounts of an ethereal solution of phenyl lithium. Into the dark brown solution of the phosphine-ylide triphenyl-beta-cyclogeranylidene phosphine so obtained, 15 parts of isodehydrocitral (boiling point 125° to 128° C. at 13 Torr.) are allowed to flow rapidly while stirring at room temperature, whereby the ether boils and becomes decolored and a colorless precipitate separates out. The mixture is heated to boiling under reflux for 2 hours, cooled, the precipitated triphenyl phosphine oxide filtered off and the ether evaporated. The residue yields by fractional distillation under reduced pressure 13.5 to 16.5 parts of pure axerophthene of the boiling point 142° C. at 0.01 Torr. in the form of a viscous pale yellow oil. With antimony chloride in chloroform it gives a red-violet color reaction and in hexane solution it shows an absorption maximum at 323 to 324 millimicrons ($\epsilon$=42,000).

*Example 2*

50 parts of triphenyl-beta-cyclogeranyl phosphonium bromide are dissolved in 250 parts of dimethyl formamide; the solution is rapidly introduced at room temperature into a sodium ethylate solution obtained by reacting 23 parts of sodium with 75 parts of absolute alcohol. The formation of the phosphine-ylide triphenyl-beta-cyclogeranylidene phosphine takes place without appreciable rise in temperature and within a few minutes. It remains in solution with a red-brown coloration. 15 parts of isodehydrocitral are then introduced, the vigorous reaction being moderated by cooling so that the temperature does not exceed 30° C. After stirring for 5 hours, the solvent is extensively distilled off at reduced pressure and the residue digested with petroleum ether. After separating the triphenyl phosphine oxide formed by filtration through a short aluminum oxide column, the filtrate is freed from solvent and the residue fractionally distilled, whereby 14 parts of axerophthene of the boiling point 141° to 142° C. at 0.01 Torr. are obtained.

*Example 3*

A solution of 25 parts of beta-cyclogeranyl-triphenyl phosphonium bromide in 20 parts of dimethyl formamide is stirred at room temperature into a suspension of 2.4 parts of sodium acetylide in 40 parts of absolute ether. The phosphine-ylide beta-cyclogeranylidene-triphenyl phosphine is thereby immediately formed. After stirring for an hour at 20° C. a suspension of 9.5 parts of 2.6-dimethyl-octatriene-(2.4.6)-al-(1)-acid-(8)-ethyl ester (melting point 78° C.) in 30 parts of absolute ether is added rapidly. A rise in temperature to about 32° C. takes place. After stirring for 2 hours, 50 parts of petroleum ether are added and the whole is then shaken with 10 percent phosphoric acid. The ether-petroleum ether layer is washed with water, dried over sodium sulfate and stored for 12 hours at −5° C. The triphenyl phosphine oxide is then filtered off and the filtrate evaporated in a slight nitrogen stream at reduced pressure. The residue is freed from lower boiling components at about 0.001 Torr. (bath temperature 110° C.). The residue (14 parts) consists almost entirely of pure vitamin-A-acid ethyl ester ($\lambda_{max}$=353 millimicrons, $\epsilon$=30,000 (in methanol)). By saponifying it in the usual way there are obtained 10.1 parts of vitamin-A-acid which after recrystallization from methanol melts at 181° to 182° C. Small amounts of cis-vitamin-A-acid of the melting point 143° to 144° C. can be isolated from the mother liquor.

*Example 4*

50 parts of beta-cyclogeranyl triphenyl phosphonium bromide are dissolved in 150 parts of dimethyl formamide and to this solution 18 parts of 2.6-dimethyloctatriene-(2.4.6)-al-(1)-acid-(8) (decomposition point 195° to 196° C.; $\lambda_{max}$ (in methanol) at 313 m$\mu$ and 324 m$\mu$ (inflexion); $\epsilon$=48,000 and $\epsilon$=42,000 respectively), the said acid being obtained by the alkaline saponification of the ethyl ester described in Example 3. The solution is cooled down to minus 20° C. and then 49 cc. of a 30 percent solution of sodium methylate in methanol are added. After stirring for one hour at 0° C. the reaction mixture is poured on ice and an excess amount of sulfuric acid of 10 percent strength and then extracted with ether. The golden yellow ethereal extract is washed with water and then shaken with a 5 percent aqueous solution of ammonia. The dark colored ammoniacal layer is separated, washed with ether and acidified with hydrochloric acid of 10 percent strength, the vitamin-A acid being obtained in a crystalline form. It is filtered off by suction, washed with water and recrystallized from methanol. The yield of pure all-trans-vitamin-A acid (fusion point 181° to 182° C.) amounts to 18 parts.

*Example 5*

75 parts of beta-cyclogeranyl triphenyl phosphonium bromide are dissolved in 150 parts of dimethyl formamide and to this solution a solution of 1 part of lithium in 100 parts of absolute ethanol is added at room temperature. In an endothermic reaction between the said components, the red brown beta-cyclogeranylidene triphenyl phosphine is formed. After stirring the reaction mixture for 30 minutes it is cooled with ice water and a solution of 29 parts of 2.6-dimethyloctatriene-(2.4.6)-al-(1)-acid-(8)-methyl ester (fusion point 86° C.; $\lambda_{max}$ (in methanol) at 316 m$\mu$ and 328 m$\mu$ (inflexion); $\epsilon$=49,000 and $\epsilon$=41,000 respectively) is fast added, the said ester being obtained by treating the acid described in Example 4 with thionyl chloride and reacting the acid chloride formed with methanol. When all of the ester has been added, the reaction mixture is further stirred for 3 hours at room temperature and then poured on ice and an excess amount of sulfuric acid of 10 percent strength. The vitamin-A acid methyl ester formed is extracted with petroleum ether. The yellow extract is washed with water, dried with sodium sulfate, filtered and then distilled, 31 parts of vitamin-A acid methyl ester being obtained (boiling point 155° to 160° C. at a pressure of 0.005 mm. Hg). By triturating the said ester with methanol 26 parts of all-trans-vitamin-A acid methyl ester are obtained (fusion point 56° to 57° C., $\lambda_{max}$ (in methanol) at 353 m$\mu$, $\epsilon$=46,000).

*Example 6*

50 parts of beta-cyclogeranyl triphenyl phosphonium bromide are dissolved in 130 parts of dimethyl formamide and to this solution a solution of 4 parts of potassium in 250 parts of tertiary butanol is added at room temperature. After stirring for about 30 minutes, the formation of the red brown beta-cyclogeranylidene triphenyl phosphine is completed. While cooling with ice a solution of 21 parts of 2.6-dimethyloctatriene-(2.4.6)-al-(1)-acid-(8)-n-propyl ester (boiling point 131° to 133° C. at a pressure of 0.08 mm. Hg) in 80 parts of dimethyl formamide is added. Stirring is continued for 5 hours and then the reaction mixture is poured on a mixture of ice and phosphoric acid of 10 percent strength and the vitamin-A acid n-propyl ester formed is extracted with petroleum ether. After washing with water, the extract is freed from the solvent in vacuo and the residue is triturated with petroleum ether at 0° C., the vitamin-A acid n-propyl ester passing into solution, whereas the triphenyl phosphine oxide remains undissolved.

The vitamin-A acid n-propyl ester is further purified by distillation. It has a boiling point of 171° to 176° C. at a pressure of 0.005 mm. Hg (with partial decomposition); $\lambda_{max}$ (in methanol)=351 to 352 m$\mu$, $\epsilon$=39,000. It is obtained in a yield of 16 parts.

Example 7

50 parts of beta-cyclogeranyl triphenyl phosphonium bromide are dissolved in 130 parts of dimethyl formamide and to this solution a solution of 2.3 parts of sodium in 100 parts of n-butanol is added at a temperature of 25° C. After stirring for 2 hours a solution of 24 parts of 2.6-dimethyloctatriene-(2.4.6)-al-(1)-acid-(8)-n-butyl ester (boiling point 140° to 143° C. at 0.01 mm. Hg) in 80 parts of dimethyl formamide is added. Then stirring is continued for 12 hours. After processing the reaction mixture as described in Example 3, there are obtained 13 parts of vitamin-A-acid-n-butyl ester, which has the boiling point 180° to 188° C. at a pressure of 0.005 mm. Hg (with partial decomposition).

The ester is purified chromatographically on an alumina column (activity 3 according to Brockmann) using a petroleum ether/benzene mixture (9:1) as solvent system, the ester then being obtained as a viscous, honey colored oil; $\lambda_{max}$ (in methanol) 351 to 352 m$\mu$, $\epsilon$=38,000. By subjecting the ester to an alkaline saponification, the all-trans-vitamin-A-acid can be obtained. It has the fusion point 181° to 182° C. (crystallized from methanol); $\lambda_{max}$ (in methanol)=352 to 353 m$\mu$, $\epsilon$=46,000.

Example 8

46 parts of beta-cyclogeranyl triphenyl phosphonium chloride, obtainable from equivalent amounts of beta-cyclogeranyl chloride and triphenyl phosphine as a viscous, colorless oil, are dissolved in 100 parts of absolute tetrahydrofurane and to this solution a solution of ethyl magnesium bromide in tetrahydrofurane prepared from 2.9 parts of magnesium is slowly added drop by drop. After stirring at a temperature of 20° to 30° C. for 6 hours, the formation of beta-cyclogeranylidene triphenyl phosphine is completed. Then a solution of 19 parts of 2.6-dimethyloctatriene-(2.4.6) - al - (1)-acid-(8)-methyl ester in 60 parts of tetrahydrofurane is added. Stirring is continued for 12 hours and then the reaction mixture is poured on a mixture of ice and an excess amount of sulfuric acid of 10 percent strength and extracted with ether. The ether extract which contains tetrahydrofurane is washed with water and dried with sodium sulfate. The solvents are distilled off in vacuo; the oily residue is triturated with ice-cold petroleum ether, the vitamin-A acid methyl ester passing into solution, whereas the triphenyl phosphine oxide remains undissolved. The solution in petroleum ether is concentrated in vacuo and the residue is distilled. 14 parts of vitamin-A acid methyl ester pass over at 160° to 162° C. at a pressure of 0.008 mm. Hg.

Example 9

50 parts of absolute tetrahydrofurane and 10 parts of beta-cyclogeranyltriphenyl phosphonium bromide are entered, while stirring, into a suspension of 8 parts of finely powdered sodium amide in 30 parts of dry benzene. To this mixture 25 parts of dimethylformamide are slowly added while cooling with ice. The formation of beta-cyclogeranylidene triphenylphosphine begins immediately with the development of ammonia, the reaction mixture assuming a red-brown coloration. After stirring for four hours the reaction mixture is filtered in a nitrogen atmosphere away from moisture. The clear red-brown filtrate is combined, while stirring, with a solution of 4 parts of 2.6-dimethyloctatriene-(2.4.6)-al-(1)-acid-(8)-ethyl ester in 20 parts of absolute tetrahydrofurane. There follows immediate reaction with the temperature rising and the reaction mixture assuming a dark coloration. After stirring for 2 hours the reaction product is poured on a mixture of ice and sulfuric acid of 10 percent strength and then the vitamin-A acid ethyl ester is isolated as described in the preceding examples. The ester has a boiling point of 165° to 168° C. at a pressure of 0.005 millimeter Hg and a $\lambda_{max}$ (in methanol) of 351 to 352 m$\mu$ with $\epsilon$=40,000. The yield is 4 parts.

This invention is a continuation-in-part application of our application Ser. No. 559,516, filed January 17, 1956.

What we claim is:

1. A process for the production of compounds of the vitamin-A series which comprises quaternizing triphenyl phosphine with a member of the group consisting of beta-cyclogeranyl chloride and bromide, adding to the beta-cyclogeranyl triphenyl phosphonium halide while excluding air and water about the equimolecular amount of a strong base selected from the group consisting of alkali metal and alkaline earth metal amides, lower alcoholates, and acetylides, ethyl magnesium bromide, and phenyl lithium, then adding about the equimolecular amount of an unsaturated aldehyde of the general formula

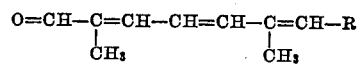

in which R represents a member of the group consisting of CH$_3$, CH$_2$OH and COOR' radicals and R' represents a lower alkyl radical to the phosphine-ylide formed, and removing the triphenyl phosphine oxide formed as a by-product from the reaction mass.

2. A process for the production of axerophthene which comprises quaternizing triphenyl phosphine with beta-cyclogeranyl bromide, adding to the beta-cyclogeranyl triphenyl phosphonium bromide while excluding air and water about the equimolecular amount of a strong base selected from the group consisting of alkali metal and alkaline earth metal amides, lower alcoholates, and acetylides, ethyl magnesium bromide, and phenyl lithium, then adding about the equimolecular amount of isodehydrocitral, heating until no more triphenyl phosphine oxide is formed, and removing the latter by filtration.

3. A process for the production of axerophthene which comprises quaternizing triphenyl phosphine with beta-cyclogeranyl bromide, adding to the beta-cyclogeranyl triphenyl phosphonium bromide while excluding air and water about the equimolecular amount of an ethereal solution of phenyl lithium, then adding about the equimolecular amount of isodehydrocitral, heating until no more triphenyl phosphine oxide is formed, and removing the latter by filtration.

4. A process for the production of axerophthene which comprises quaternizing triphenyl phosphine with beta-cyclogeranyl bromide, adding to the beta-cyclogeranyl triphenyl phosphonium bromide while excluding air and water about the equimolecular amount of an alcoholic solution of sodium alcoholate, then adding about the equimolecular amount of isodehydrocitral, heating until no more triphenyl phosphine oxide is formed, and removing the latter by filtration.

5. A process for the production of vitamin-A acid lower alkyl esters which comprises quaternizing triphenyl phosphine with beta-cyclogeranyl bromide, adding to the beta-cyclogeranyl triphenyl phosphonium bromide while excluding air and water about the equimolecular amount of a strong base selected from the group consisting of alkali metal and alkaline earth metal amides, lower alcoholates, and acetylides, ethyl magnesium bromide, and phenyl lithium, then adding about the equimolecular amount of a 2.6-dimethyl-octatriene-(2.4.6)-al-(1)-acid-(8) lower alkyl ester, heating until no more triphenyl phosphine oxide is formed and removing the latter by filtration.

6. A process for the production of vitamin-A acid ethyl ester which comprises quaternizing triphenyl phosphine with beta-cyclogeranyl bromide, adding to the beta-cyclogeranyl triphenyl phosphonium bromide, while excluding air and water, about the equimolecular amount of sodium acetylide, then adding about the equimolecular amount of 2.6-dimethyl-octatriene-(2.4.6)-al-(1)-acid-(8) ethyl ester, heating until no more triphenyl phosphine oxide is formed and removing the latter by filtration.

References Cited in the file of this patent

UNITED STATES PATENTS

| 2,369,168 | Milas | Feb. 13, 1945 |
| 2,540,118 | Isler | Feb. 6, 1951 |
| 2,674,621 | Oroshnik | Apr. 6, 1954 |

OTHER REFERENCES

Wittig et al.: Chem. Berichte, 87, 1954, pages 1318–1330.